United States Patent
Jenkins et al.

(10) Patent No.: US 6,678,682 B1
(45) Date of Patent: Jan. 13, 2004

(54) METHOD, SYSTEM, AND SOFTWARE FOR ENTERPRISE ACCESS MANAGEMENT CONTROL

(75) Inventors: Carmen Murphy Jenkins, Silver Spring, MD (US); Vidisha Powell, Fairfax, VA (US); Thomas Rae, Derwood, MD (US)

(73) Assignee: G.E. Information Services, Inc., Gaithersburg, MD (US)

( * ) Notice: Subject to any disclaimer, the term of this patent is extended or adjusted under 35 U.S.C. 154(b) by 267 days.

(21) Appl. No.: 09/722,611

(22) Filed: Nov. 28, 2000

(51) Int. Cl.[7] ............................................... G06F 17/30
(52) U.S. Cl. .......................................................... 707/9
(58) Field of Search ........................ 707/9, 10, 5, 104.1, 707/102; 709/225; 705/83

(56) References Cited

U.S. PATENT DOCUMENTS

| | | | | |
|---|---|---|---|---|
| 5,191,611 A | * | 3/1993 | Lang ............................. | 705/53 |
| 5,581,764 A | * | 12/1996 | Fitzgerald et al. ............ | 709/223 |
| 6,112,049 A | * | 8/2000 | Sonnenfeld ................... | 434/350 |
| 6,178,308 B1 | * | 1/2001 | Bobrow et al. ............... | 434/350 |
| 6,256,671 B1 | * | 7/2001 | Strentzsch et al. ........... | 709/227 |

* cited by examiner

Primary Examiner—Safet Metjahic
Assistant Examiner—Sana Al-hashemi
(74) Attorney, Agent, or Firm—Foley & Lardner (57) ABSTRACT

A system, method, and software for automated enterprise access management control includes an access manager service that receives access management control schemas from a plurality of registered application. An access management data store stores the received access management control schemas associated with their respective registered applications, and the access management service provides a respective access management control schema to a requesting one of the plurality of applications.

33 Claims, 6 Drawing Sheets

METHOD, SYSTEM, AND SOFTWARE FOR ENTERPRISE ACCESS MANAGEMENT CONTROL

BACKGROUND OF THE INVENTION

1. Field of the Invention

This invention relates generally to the field of automated access management control and more particularly to a method, system, and software for centralized enterprise access management control for multiple applications.

2. Background of the Related Art

Business applications that manage proprietary data must integrate some access control into their service to protect the business data from unauthorized access and/or use. To accomplish this result new applications must each build appropriate access control. This requires application developers to design and develop access control features each time a new application is developed. This process is both time consuming and inefficient and also consumes valuable developer resources that are in short supply in a business environment in which rapid application development and deployment is critical since time to market is often a critical success factor for businesses.

Another problem with having several different access management control schemes across different applications in an enterprise is that additional administrator training and resources are required to implement these different access management control schemes.

Furthermore, often a single pool of users use several of these different business applications across an enterprise. Setting up the users separately for each of these different business applications is inefficient and can negatively impact productivity because some users are not correctly set up across all the different business applications that they need to access.

SUMMARY OF THE INVENTION

Therefore, it is a general object of the invention to alleviate the problems and shortcomings identified above.

In one aspect, the present invention provides a computer implemented method of providing enterprise access management control, including the steps of: receiving access management control schemas from a plurality of registered applications; centrally storing the received access management control schemas associated with their respective registered applications; and providing a respective access management control schema to a requesting one of the plurality of applications.

In one aspect, the method of the present invention further includes receiving user privilege sets for users of a registered application; and storing the received user privilege sets for users of the registered application.

In a further aspect, the present invention includes receiving a request for a user privilege set of a user of the registered application from the registered application; and returning the requested user privilege set to the registered application.

In a further aspect, the method of present invention includes the registered application verifying an action request from the user against the returned user privilege set and granting or denying the action request based on the results of verifying the action request.

In a further aspect of the present invention the access control schema includes access control rules that control access to at least one of data or actions.

In another aspect of the present invention, the access control schema includes privilege sets that are available for assignment to principals that include users, companies, or roles.

In a further aspect of the present invention, the access control rules define which actions are permissible for which principals.

In one important aspect, the present invention includes a computer readable data storage medium having program code recorded thereon for providing enterprise access management control, the program code including: a first program code for receiving access management control schemas from a plurality of registered applications; a second program code for centrally storing the received access management control schemas associated with their respective registered applications; and a third program code for providing a respective access management control schema to a requesting one of the plurality of applications.

In a further aspect of the present invention, the program code includes a fourth program code that receives user privilege sets for users of a registered application; and a fifth program code that stores the received user privilege sets for users of the registered application.

In yet another aspect, the program code according to the present invention includes: a sixth program code that receives a request for a user privilege set of a user of the registered application from the registered application; and a seventh program code that returns the requested user privilege set to the registered application.

In another important aspect, the present invention provides a system for automated enterprise access management control that includes: an access manager service that receives access management control schemas from a plurality of registered application; and an access management data store that stores the received access management control schemas associated with their respective registered applications, wherein the access management service provides a respective access management control schema to a requesting one of the plurality of applications.

In another aspect, the access manager service receives privilege sets for users of registered applications, and stores the received privilege sets in the access control data store.

In a further aspect, the system of the present invention includes an access manager toolkit for a registered application that requests a privilege set for a user of the registered application, wherein the access manager service returns the requested privilege set to the registered application and the access manager toolkit of the registered application verifies an action request from a user against the returned privilege set to grant or deny access to the user based on results of the verification.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

Figure 1:
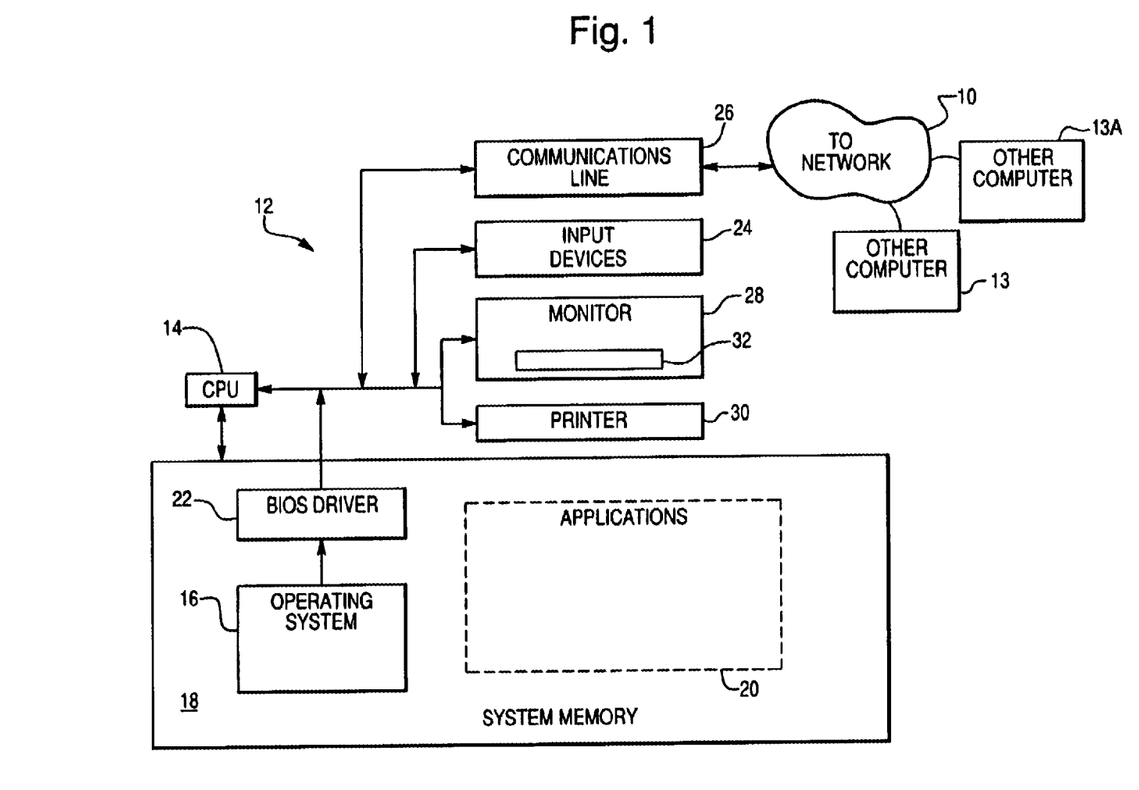
FIG. 1 is a block diagram showing the components of a general purpose computer system connected to an electronic network.

With reference to the figures, FIG. 1 is a block diagram showing the components of a general purpose computer system 12 connected to an electronic network 10, such as a computer network. The computer network 10 can also be a public network, such as the Internet or Metropolitan Area Network (MAN), or other private network, such as a corporate Local Area Network (LAN) or Wide Area Network (WAN), or a virtual private network. As shown in the FIG. 1, the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse and a keyboard 32, and output devices such as a printer 30 and a display monitor 28.

The computer system generally includes a communications interface 26, such as an Ethernet card, to communicate to the electronic network 10. Other computer systems 13 and 13A also connect to the electronic network 10. One skilled in the art would recognize that the above system describes the typical components of a computer system connected to an electronic network. It should be appreciated that many other similar configurations are within the abilities of one skilled in the art and all of these configurations could be used with the method and system of the present invention. Furthermore, it should be recognized that the computer system and network disclosed herein can be programmed and configured as access management service processing and storage sites, by one skilled in the art, to implement the method, system, and software discussed further herein.

In addition, one skilled in the art would recognize that the "computer" implemented invention described further herein may include components that are not computers per se but include devices such as Internet appliances and Programmable Logic Controllers (PLCs) that may be used to provide one or more of the functionalities discussed herein. Furthermore, while "electronic" networks are generically used to refer to the communications network connecting the computing sites, one skilled in the art would recognize that such networks could be implemented using optical or other equivalent technologies.

Figure 2:
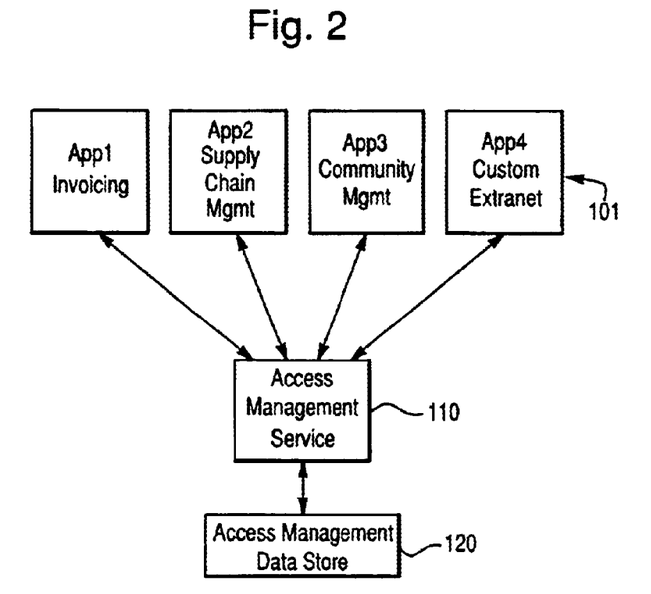
FIG. 2 is block diagram showing the components of one preferred embodiment of the enterprise access management control system according to the present invention.

FIG. 2 is a block diagram showing the components of the enterprise access management control system according to the present invention. One or more applications 101 are connected to an centralized access management service 110 that is associated with a access management data store 120. It should be understood that the access management service 110 is logically centralized. One skilled in the art would recognize that the access management service 110 could physically be located in a distributed configuration as long as suitable hardware and programmed software were provided to coordinate the distributed configuration and provide the centralized access management service as discussed further herein.

Likewise, one skilled in the art would recognize that the access management data store 120 is logically centralized and associated with a corresponding access management service 110, while it could be physically implemented in a distributed configuration. Typically the access management data store will include one or more commercial databases, such as relational databases available from Oracle or Sybase, together with the programmed software and suitably configured hardware to store the data. The common data storage is logically one data store but could easily be implemented physically as distributed databases with appropriate software, hardware, and networking to manage and coordinate the distributed databases.

One skilled in the art would recognize that other system configurations and data structures could be provided to implement the functionality of the present invention. All such configurations and data structures are considered to be within the scope of the present invention as discussed herein.

In this context, it is also to be understood that the present invention utilizes known security measures for transmission of electronic data across networks. Therefore, encryption, authentication, verification, and other security measures for transmission of electronic data across both public and private networks are provided, where necessary, using techniques that are well known to those skilled in the art.

The present invention provides for the automation and centralized management of the following steps for a centralized enterprise access management control: (1) defining the access control schema for an application 101; (2) applying the access privileges to users within the shared system; and (3) providing the ability to enforce the access control policy within each application.

Accordingly, the present invention provides that application developers can define the access control schema for each application 101 once and upload the access control schema to the access management service 110 to be stored in the access management data store 120. In one embodiment, the access control schema can be defined in a document that is then uploaded to the access management service 110, which then stores the access control schema in the access management data store. The stored access control schema is associated with a respective application, for example, by associating an application identifier (ID) with each stored access control schema.

The access control schema defines the privilege sets that are available for assignment to the users of the application and also defines the scopes of the applicability of the privilege sets (i.e., to appropriate parts of the applications). Therefore, the scope of the privilege sets can extend to data, actions, or a combination of the data and actions that are available for access and/or manipulation in the application.

Figure 3:
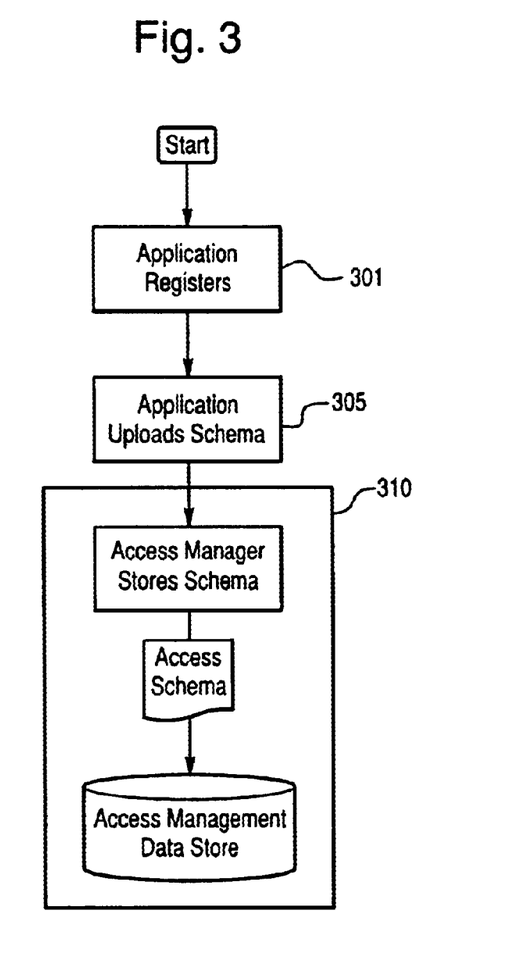
FIG. 3 is a flow diagram illustrating the process of an application providing its application control schema to the access manager service.

FIG. 3 is a flow diagram that illustrates the process by which a new application provides or updates its access control schema to the central access management service 110. In step 301, an application 101 establishes a communication session with the access management service 110 and registers itself with the access management service 110 by, for example, providing an application ID. The registration process may verify that the application ID provided is unique or valid and may also check security and authorization features of the requesting application administrator using security and authorization techniques that are well known to those skilled in the art. If the verification and security/authorization processes are successful, the application 101 is registered with the access management server 110.

Once the new application 101 has successfully registered with the access management service 110, the application 101 transmits its access control schema to the access management server in step 305. As discussed earlier, in the preferred embodiment, the access control schema can be defined in a file that is uploaded to the access manager service 110. However, it is to be understood that any electronic transmission can be used to transmit the access control schema to the access management service 110, whether the transmission be in real-time, batch mode, or event driven.

In step 310, the access management service 110 stores the access control schema in the access management data store 120. Furthermore, the stored access control schema is associated with its application 101 by, for example, storing the application ID of the application 101 together with the access control schema in the access management data store 120.

Figure 4:
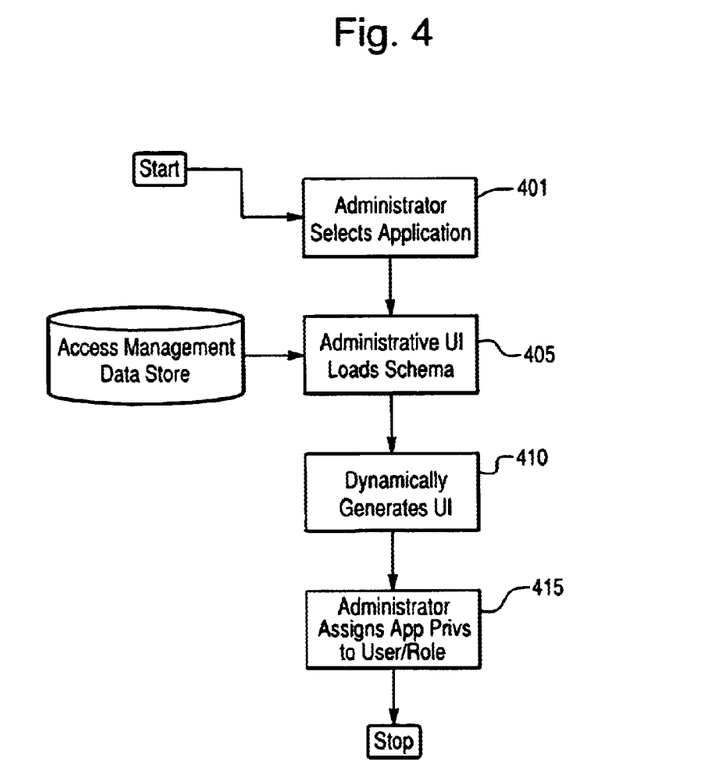
FIG. 4 is a flow diagram illustrating the steps of applying the access management controls to the users according to the present invention.

FIG. 4 is a flow diagram illustrating the steps of one preferred embodiment of applying the enterprise access management controls to the users according to the present invention. In step 401, an administrator selects one of the applications 101 (for example, identified by its application ID). In step 405, an administration application, provided according to the present invention, accesses the access management data store 120 through the access management service 110 by using the application ID. The administration application loads the access control schema (or a relevant portion thereof for the selected application In step 410, the administrative application dynamically generates a User Interface (UI) so that the administrator can assign privilege sets to the various principals that are recognized by the application and identified in the access control schema for that application. Therefore, the principals for the application can include users, companies or other entities, or roles that can be assigned to users. In step 415, the assigned privilege sets is sent to access management service 110 for storage in the access management data store 120.

It should be noted that one of the important features of the present invention is dynamic generation of an administrative user interface that makes it easier for administrators to perform their tasks. Therefore, the present invention provides a user interface generator application that receives an application identifier from an administrator and generates a user interface in which the administrators choices are limited by the content of the access control schema, corresponding to that application, that is stored in the access management data store 120 or is otherwise accessible by, for example, the access manager service 110.

For example, the user interface generated for a particular application may restrict the administrator to choose among valid choices (by, for example, using drop down lists) based on the content of the access control schema for that particular application. Therefore, if the access control schema contains elements similar to the exemplary access control schema discussed further herein, the administrator may be restricted by the generated administrative user interface to select from valid principals, permissions, scopes, and targets as stored in the access control schema corresponding to a particular application.

Figure 5:
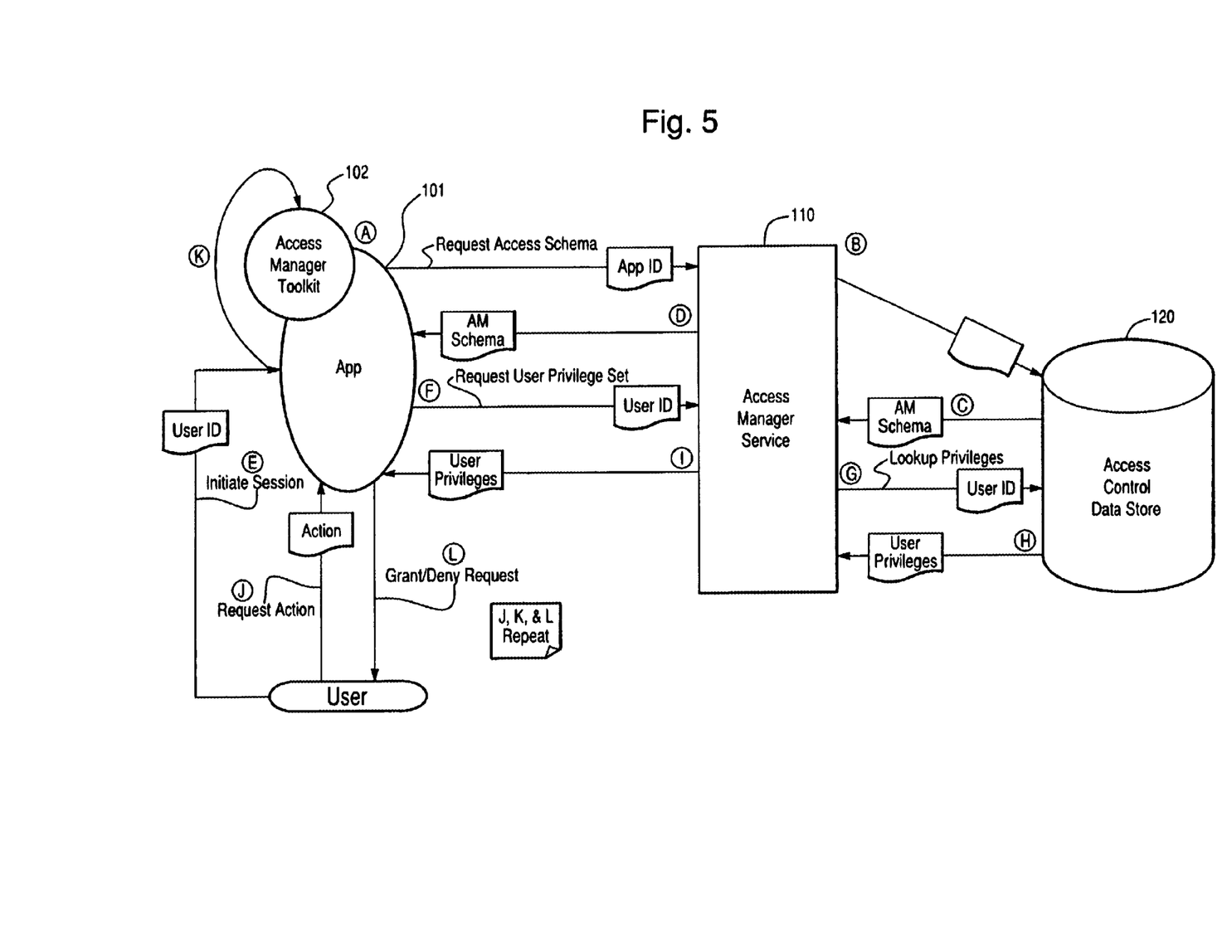
FIG. 5 is a block diagram that illustrates the components and their interactions involved in enforcing the access control according to one preferred embodiment of the present invention.

FIG. 5 is a block diagram that illustrates the components and their interactions involved in enforcing the access control according to one preferred embodiment of the present invention. As shown in step A, when an application 101 first loads up it requests its access control schema from the access manager (or management) service 110 by providing, for example, its application identifier. In step B, the application management service 110 looks up the application 101 access control schema in the access control data store 120.

In step C, the access control data store 120 returns the requested access control schema to the access manager service 110 which, in turn, returns it to the requesting application 101 in step D. The requesting application 101 loads up the received access management control schema (or a relevant portion thereof) to its access manager toolkit 102.

In step E, a user of the application 101 begins a session with the application 101. In step F, when a new user session begins, the application 101 requests the privileges (or privilege set) for that user from the access manager service 110. In step G, the access manager service 110 looks up that user's privileges in the access control data store 120 which returns the user's privileges in step H.

In step I, the access manager service 110 returns the requested user's privilege set to the application 101 which loads it up into its access manager toolkit 102. It should be noted that the access manager toolkit is implemented in software with suitable data structures to perform the functionality disclosed herein as would be within the abilities of one skilled in the art.

Thereafter, when in step J, a user requests to perform some action (or access certain data), the application 101 uses the application management toolkit 102 to evaluate (or verify) whether the user's request is valid in step K. Finally, in step L. the application 101 grants or denies the user's request based on the evaluation (or verification) and communicates the same to the user.

It should be noted that steps A–D are repeated each time an application loads up. Steps J, K, and L are repeated for each request made by a user during a session, while steps F–L are repeated each time a new user session is created.

Access Control Syntax

The following sections describe one preferred embodiment of the syntax and structure that may be used to define access rights (or privilege sets) with the access management service provided by the present invention.

An access control rule ties together what principals (users, companies, or roles) can perform what actions within an application (their rights). It may also specify what particular areas (or scope) within that application that a user may have rights. It should be noted that a "principal" is any entity to which an access control privilege can be assigned with a user, a company, or a role being examples of principals. Other principals, such as an application, is also possible as long as it is an entity to which access control privileges can be assigned.

A permission describes an action that may be protected. For example, a permission can be a general action, such as, "read" or "write" or it could be more specific such as "publish sales numbers." A "role" is a label associated with one or more access control rules.

Figure 6:
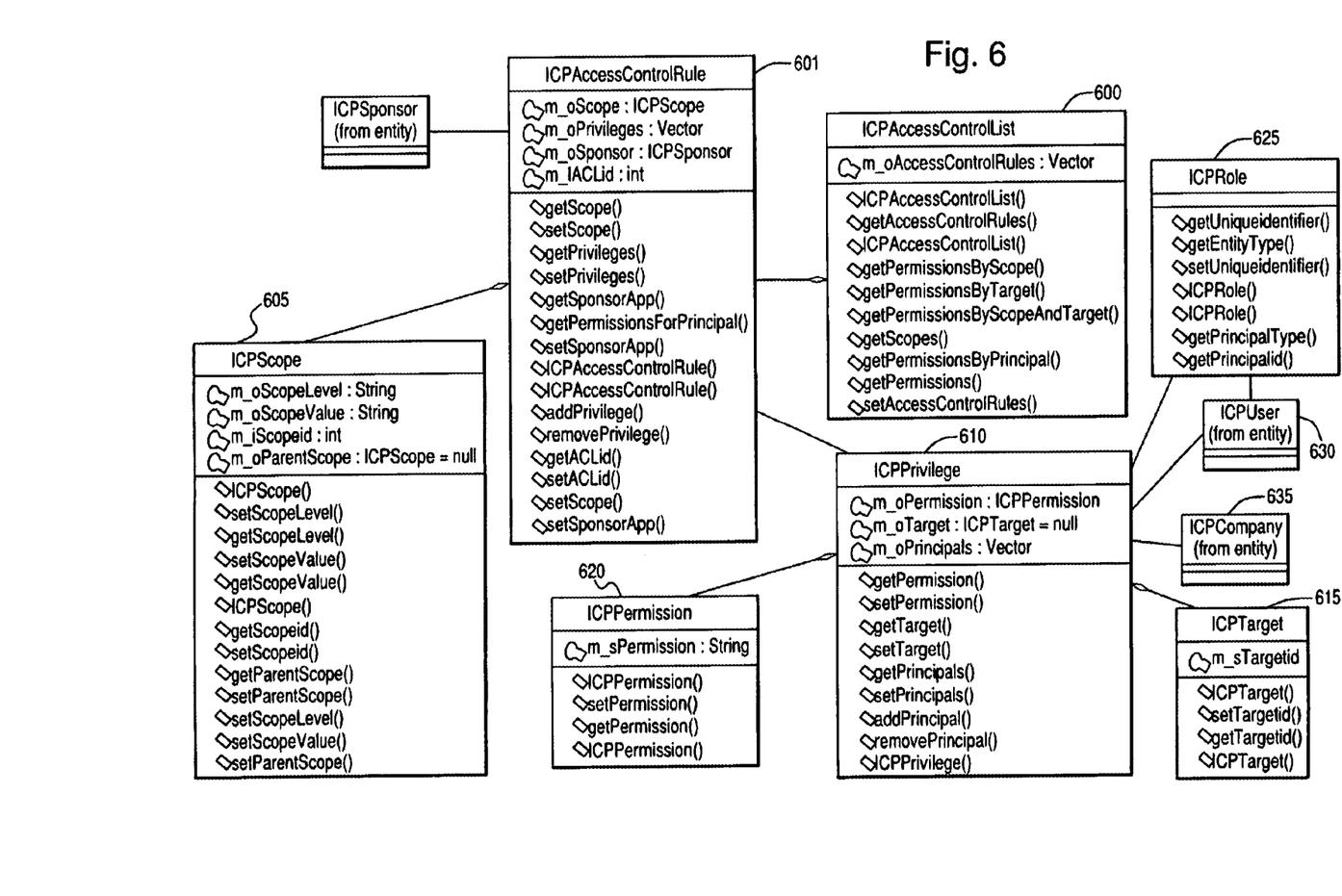
FIG. 6 is a class diagram of one exemplary implementation of the access control according to the present invention.

FIG. 6 is a class diagram illustrating one exemplary implementation for the access control provided by the present invention. An ICPAccessControl List 600 is an aggregation of ICPAccessControlRule objects 601. Each ICPAccessControlRule object 601 is made up of one ICPScope object 605 and one or more ICPPrivilege objects 610. The ICPScope class 605 contains the scope portion of an access control rule. The ICPPrivilege class 610 contains the privilege and target (an optional description of an object that permission may be directed towards) portions of an access control rule. An ICPPrivilege object is made of an ICPPermission 620 object and optionally an ICPTarget 615 object. Each ICPPrivilege object 610 is also associated with one or more ICPRole 625, ICPUser 630, and ICPCompany 635 objects.

Therefore, the "access control schema" for an application defines the makeup for valid access control rules within an application. As an example, an application that processes purchase orders may have the following exemplary schema. (1) Scope Levels can include Company, Division, or User. (2) Permission Levels can be limited as shown in the following table.

| Permission Type | Valid Targets | Valid Scope Levels |
| --- | --- | --- |
| Create | Purchase Order Acknowledgement | Company Division |
| Read | Purchase Order Acknowledgement | Company Division |
| Update | Purchase Order | Company Division |
| Delete | Purchase Order Acknowledgement | Company Division |
| Change Password | N/A | Company User |

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer implemented method of providing enterprise access management control, comprising the steps of:

receiving respective access management control schemas from a plurality of registered applications;

centrally storing, in an access control data store, the respective received access management control schemas associated with their respective registered applications; and providing, from the access control data store, a particular access management control schema to a requesting one of the plurality of applications when the requesting one of the plurality of applications first loads up, wherein the particular access control schema is stored associated with the requesting one of the plurality of applications in the access control data store, wherein the requesting one of the plurality of applications loads up the particular access control schema to control access to the application and components accessed by the application based on the particular access control schema.

2. The computer implemented method according to claim 1, further comprising the steps of:

receiving privilege sets for users of a registered application; and storing the received privilege sets for users of the registered application.

3. The computer implemented method according to claim 1, wherein the access control schema includes access control rules that control access to at least one of data or actions.

4. The computer implemented method according to claim 1, further comprising the steps of:

receiving an application identifier of one of the registered applications from an administrator; and generating and displaying an administrative user interface with the administrator's choices limited by the content of the access control schema for the application identified by the application identifier.

5. The method according to claim 1, wherein the particular access control schema controls access to the requesting one of the plurality of applications at an application layer level.

6. The computer implemented method according to claim 2, further comprising the steps:

receiving a request for a privilege set of a user of the registered application from the registered application; and returning the requested privilege set to the registered application.

7. The computer implemented method according to claim 3, wherein the access control schema includes privilege sets that are available for assignment to users.

8. The method according to claim 5, wherein the plurality of applications execute on a same host computer.

9. The computer implemented method according to claim 6, further comprising the step of the registered application verifying an action request from the user against the returned privilege set and granting or denying the action request based on the results of verifying the action request.

10. The computer implemented method according to claim 7, wherein the privilege sets are defined for principals that include users, companies, or roles.

11. The computer implemented method according to claim 10, wherein the access control rules define which actions are permissible for which principals.

12. A computer readable data storage medium having program code recorded thereon that, when executed, causes a computing system to provide enterprise access management control, the program code comprising:

a first program code for receiving respective access management control schemas from a plurality of registered applications;

a second program code for centrally storing, in an access control data store, the respective received access management control schemas associated with their respective registered applications; and a third program code for providing, from the access control data store, a particular access management control schema to a requesting one of the plurality of applications when the requesting one of the plurality of applications first loads up, wherein the particular access control schema is stored associated with the requesting one of the plurality of applications in the access control data store, wherein the requesting one of the plurality of applications loads up the particular access control schema to control access to the application and components accessed by the application based on the particular access control schema.

13. The computer readable data storage medium according to claim 12, further comprising:

a fourth program code that receives user privilege sets for users of a registered application; and a fifth program code that stores the received user privilege sets for users of the registered application.

14. The computer readable data storage medium according to claim 12, wherein the access control schema includes access control rules that control access to at least one of data or actions.

15. The computer readable data storage medium according to claim 12, further comprising:
- a fourth program code that receives an application identifier from an administrator; and
- a fifth program code that generates and displays an administrative user interface with the administrator's choices limited based on the content of the access control schema for the application identified by the application identifier.

16. The computer readable data storage medium according to claim 12, wherein the particular access control schema controls access to the requesting one of the plurality of applications at an application layer level.

17. The computer readable data storage medium according to claim 13, further comprising:
- a sixth program code that receives a request for a user privilege set of a user of the registered application from the registered application; and
- a seventh program code that returns the requested user privilege set to the registered application.

18. The computer readable data storage medium according to claim 14, wherein the access control schema includes privilege sets that are available for assignments to principals.

19. The computer readable data storage medium according to claim 16, wherein the plurality of applications execute on a same host computer.

20. The computer readable data storage medium according to claim 17, wherein the registered application verifies an action request from a user against the returned user privilege set and grants or denies the action request based on the results of verifying the action request.

21. The computer readable data storage medium according to claim 18, wherein the privilege sets are defined for principals that include users, companies, or roles.

22. The computer readable data storage medium according to claim 21, wherein the access control rules define which actions are permissible for which principals.

23. A system for automated enterprise access management control comprises:
- an access manager service that receives respective access management control schemas from a plurality of registered applications; and
- an access control data store that stores the respective received access management control schemas associated with the respective registered applications,
- wherein the access management service provides, from the access control data store, a particular access management control schema to a requesting one of the plurality of applications when the requesting one of the plurality of applications first loads up, wherein the particular access control schema is stored associated with the requesting one of the plurality of applications in the access management data store,
- wherein the requesting one of the plurality of applications loads up the particular access management control schema to control access to the application and components accessed by the application based on the particular access management control schema.

24. The system according to claim 23, wherein the access manager service receives privilege sets for users of registered applications, and stores the received privilege sets in the access control data store.

25. The system according to claim 23, wherein the access management control schema includes access control rules that control access to at least one of data or actions.

26. The system according to claim 23, further comprising an administrative user interface generator that receives an application identifier from an administrator and generates an administrative user interface with the administrator's choices limited based on the content of the access management control schema for the application identified by the application identifier.

27. The system according to claim 23, wherein the particular access management control schema controls access to the requesting one of the plurality of applications at an application layer level.

28. The system according to claim 24, further comprising an access manager toolkit for a registered application that requests a privilege set for a user of the registered application,
- wherein the access manager service returns the requested privilege set to the registered application.

29. The system according to claim 24, wherein the access manager toolkit of the registered application verifies an action request from a user against the returned privilege set to grant or deny access to the user based on results of the verification.

30. The system according to claim 25, wherein the access management control schema includes privilege sets that are available for assignment to principals.

31. The system according to claim 27, wherein the plurality of applications execute on a same host computer.

32. The system according to claim 30, wherein the privilege sets are defined for principals that include users, companies, or roles.

33. The system according to claim 32, wherein the access control rules define which actions are permissible for which users.

* * * * *